(12) United States Patent
Bringer et al.

(10) Patent No.: US 9,356,786 B2
(45) Date of Patent: May 31, 2016

(54) METHOD FOR ENCRYPTING A PLURALITY OF DATA IN A SECURE SET

(71) Applicant: MORPHO, Issy-les-Moulineaux (FR)

(72) Inventors: Julien Bringer, Issy les Moulineaux (FR); Herve Chabanne, Issy les Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/385,337

(22) PCT Filed: Mar. 14, 2013

(86) PCT No.: PCT/EP2013/055297
§ 371 (c)(1),
(2) Date: Sep. 15, 2014

(87) PCT Pub. No.: WO2013/135846
PCT Pub. Date: Sep. 19, 2013

(65) Prior Publication Data
US 2015/0039899 A1 Feb. 5, 2015

(30) Foreign Application Priority Data

Mar. 15, 2012 (FR) .................................... 12 52365

(51) Int. Cl.
*H04L 29/06* (2006.01)
*H04L 9/32* (2006.01)
(Continued)

(52) U.S. Cl.
CPC .......... *H04L 9/3231* (2013.01); *G06K 9/00885* (2013.01); *H04L 9/304* (2013.01); *H04L 9/3093* (2013.01); *H04L 9/3236* (2013.01); *G06K 2009/00953* (2013.01)

(58) Field of Classification Search
CPC ..... H01L 9/3093; H01L 9/304; H01L 9/3236; G06K 9/00885; G06K 2009/00953; H04L 9/3231
See application file for complete search history.

(56) References Cited

U.S. PATENT DOCUMENTS 7,627,904 B2 * 12/2009 Tokkonen ........................ 726/27
7,739,733 B2 *  6/2010 Szydlo ............................ 726/17
(Continued)

OTHER PUBLICATIONS

International Search Report and Written Opinion issued Jun. 24, 2013 in PCT/EP2013/055297 filed Mar. 14, 2013 (with English translation of Category of Cited Documents).
(Continued)

*Primary Examiner* — Mohammad A Siddiqi
(74) *Attorney, Agent, or Firm* — Oblon, McClelland, Maier & Neustadt, L.L.P.

(57) ABSTRACT

A server-implemented method encrypting at least two pieces of indexed data as lists of elements, each element belonging to a finite set of indexed symbols on an alphabet. The data is encrypted to form a protected set, including: the server randomly generates, for each datum, a corresponding encoding function; if at least one element that constitutes a datum is the symbol of the alphabet, the server determines the image of the symbol of the alphabet via the encoding function corresponding to the datum to obtain a codeword coordinate and adds the codeword coordinate to an indexed set corresponding to the element of the alphabet; then the server completes the indexed set with error-inducing points; the server randomly reindexes the elements of the indexed set corresponding to the symbol of the alphabet; and the server adds the indexed set to the protected set. The method can identify an individual.

14 Claims, 5 Drawing Sheets

(51) Int. Cl.
*H04L 9/30* (2006.01)
*G06K 9/00* (2006.01)

(56) References Cited

U.S. PATENT DOCUMENTS

| | | | | |
|---|---|---|---|---|
| 2006/0123239 | A1* | 6/2006 | Martinian et al. | 713/186 |
| 2006/0123241 | A1* | 6/2006 | Martinian et al. | 713/186 |
| 2008/0044027 | A1* | 2/2008 | Van Dijk | 380/278 |
| 2008/0235515 | A1* | 9/2008 | Yedidia et al. | 713/186 |
| 2009/0262990 | A1* | 10/2009 | Choi et al. | 382/125 |
| 2013/0004033 | A1* | 1/2013 | Trugenberger | 382/125 |

OTHER PUBLICATIONS

Preliminary Search Report and Written Opinion issued Dec. 17, 2012 in French Patent Application No. FR1252365 with English translation of Category of Cited Documents).

International Search Report issued Jun. 24, 2013, in PCT/EP13/055297, filed Mar. 14, 2013.

Juels, A. et al., "A Fuzzy Vault Scheme", Designs, Codes and Cryptography, Kluwer Academic Publishers, Bo., vol. 38, no. 2, (18 pages), 2006 XP019205891.

Kasahara, M., "A generalization of Secret Sharing Scheme on the Basis of Recovering Algorithm, K-RA", International Association for Cryptologic Research, vol. 20070323: 100353, pp. 1-7, XP061002281, 2007.

Chang, Ee-Chien et al., "Secure Sketch for Multi-Sets", International Association for Cryptologic Research, vol. 20060315:181400, pp. 1-5, XP061001775, 2006.

Translation of the Written Opinion of the International Search Report for PCT/EP2013/055297 dated Sep. 15, 2014.

Translation of the International Preliminary Report on Patentability for PCT/EP2013/055297 dated Sep. 16, 2014.

\* cited by examiner

Figure 1a

```
Initialize a counter cpt ← 0 and the sets S_1,..., S_N to the empty set:
S_i ← ∅, i = 1,..., N
for i = 1 to N do
    for j = 1 to l do
        if x_i ∈ A^j then
            S_i ← S_i ∪ {F_j(x_i)}
        end
    end
    set l_i ← #S_i
    if l_i ≠ 0 then
        cpt ← cpt + 1
        for j = l_i + 1 to ℓ do
            let y_i^j randomly chosen in Y \ {F_d(x_i)}_{d=1,...,l}
            let S_i ← S_i ∪ {y_i^j}
        end
    end
end
randomly choose i_{cpt+1},..., i_r such that #S_{i_e} = 0 for e ∈|{cpt + 1,..., r}
for e = cpt + 1 to r do
    for j = 1 to ℓ do
        let y_{i_e}^j randomly chosen in Y \ {F_d(x_{i_e})}_{d=1,...,l}
        let S_{i_e} ← S_{i_e} ∪ {y_{i_e}^j}
    end
end
```

METHOD FOR ENCRYPTING A PLURALITY OF DATA IN A SECURE SET

FIELD OF THE INVENTION

The invention concerns the field of the encrypting of data and the comparison of encrypted data with a candidate data item for assessing similarities between one of the encrypted data items and the candidate data item.

The invention is applicable in particular to the field of biometry, for encrypting individual biometric data, and identifying a candidate individual by comparing one of his biometric data with the encrypted data.

PRIOR ART

A method for encrypting a data item known by the term "fuzzy vault" scheme is known, this method having been described in the following articles:

Ari Juels and Maghu Sudan, A fuzzy vault scheme. *In Proceedings of IEEE International Symposium on Information Theory, ISIT*, Lecture Notes in Computer Science, page 408, 2002, and An Juels and Maghu Sudan, A fuzzy vault scheme. *Des. Codes Cryptography*, 38(2):237-257, 2006

The "fuzzy vault" scheme consists of integrating, in a mathematical set called "fuzzy vault", and referred to hereinafter as a "protected set", information related to a data item A, as well as supplementary parasitic information that is generated randomly and is independent of the data item A. This parasitic information makes it possible to mask the information related to A.

More precisely, this encrypting applies to a data item A in the form of a list of indexed elements $a_i$ of a finite field F.

During this method, a polynomial p having certain mathematical properties not described here is generated randomly and, for each element $a_i$ of A, the image by p of the element $a_i$ is computed.

The pairs consisting of the elements $a_i$ of the data item A and their images by p are then added to the protected set.

And finally, error-inducing points are added to the protected set, these points being randomly generated pairs ($x_i$, $x_i'$), such that $x_i$ is not an element of A, and $x_i'$ is not the image by p of $x_i$. Mathematically, $x_i \in F \backslash A$, $x_i' \in \{p(x_i)\}$.

A set of pairs ($x_i^*, x_i^{*'}$) is therefore obtained in which either the abscissas $x_i^*$ belong to A and $x_i^{*'} = p(x_i^*)$, or they belong to $F \backslash A$, and in this case $x_i^{*'}$ are chosen in $F \backslash p(A)$.

Adding a large number of error-inducing points makes it possible to mask the points related to the data item A and to the polynomial p.

Next, the protected set is used to compare a second data item B with the data item A, without obtaining information on said data item A.

To do this, decrypting algorithms have been developed, making it possible to compare a data item B, in the form of a list of indexed elements $b_i$, with the protected set, in order to determine whether the data item B corresponds to the data item A with a degree of similarity exceeding a predetermined threshold.

In particular, B corresponds to A if a large number of elements $b_i$ correspond to elements $a_i$ of A, the latter elements being situated by definition in the protected set.

The argument of these decrypting algorithms is the elements $b_i$ of the data item B that correspond to abscissas $x_i$ of the protected set, and their result is a polynomial p'. If B corresponds sufficiently to A, the polynomial p' is the polynomial p that was used for encrypting the data item A.

It is then possible to apply this polynomial p to all the elements $b_i$ of B corresponding to abscissas $x_i$ of the protected set in order to determine which elements $b_i$ are also elements $a_i$ of A, since by construction only the pairs comprising an element and an image of this element by p are elements of A.

An example of a suitable decrypting algorithm is of the type for decrypting a Reed-Solomon code.

The fuzzy vault scheme therefore makes it possible to compare two data items without obtaining information on one of the data.

However, it is limited to a comparison of two data items and cannot be applied to a comparison of a data item with a set of several data in a data bank. This type of comparison is however used more and more frequently, in particular in the context of the biometric identification of individuals.

There therefore exists a need for extending the principle of the fuzzy vault scheme to a plurality of data in a data bank, so as to enable a comparison of the data in the bank with a given third party, without obtaining information on these.

Presentation of the Invention

One aim of the invention is to overcome the problem mentioned above.

This aim is achieved in the context of the present invention by means of a method for encrypting a set of at least two indexed data implemented by a server, the data being in the form of lists of elements, each element of which belongs to a finite set of indexed symbols called an alphabet, the method being characterised in that the data is encrypted to form a protected set, the step of encrypting and creating the protected set comprising the following steps:

the server randomly generates, for each data item in the base, a corresponding encoding function, and for each symbol of the alphabet,
  for each data item,
    if at least one element of the list that constitutes the data item is the symbol of the alphabet, the server determines the image of said symbol of the alphabet via the encoding function corresponding to the data item in order to obtain a codeword coordinate that is a function of the data item and of the symbol of the alphabet,
    the server adds the codeword coordinate thereby obtained to an indexed set corresponding to the element of the alphabet, the set having a predetermined cardinal,
  then the server randomly re-indexes the elements of the indexed set corresponding to the symbol of the alphabet, and
  the server adds the indexed set corresponding to the symbol of the alphabet to the protected set.

Advantageously, but optionally, the invention may further comprise at least one of the following features:

for each symbol in the alphabet, prior to the re-indexing step, the server completes the indexed set corresponding to the alphabet element with error-inducing points;

for the symbols of the alphabet that do not correspond to any element of the data in the base,
  the server randomly selects some of said elements,
  for each element selected, it creates a predetermined cardinal set with an index corresponding to that of the element, and adds to this element as many error-inducing points as the cardinal of the element;

the non-selected symbols of the alphabet are associated with an empty set;

the error-inducing points are points generated randomly among a destination set of the encoding functions, deprived of the images of the symbols of the alphabet by the encoding functions corresponding to the data;

the encoding functions corresponding to the data are associated with an evaluation code for which there exists at least one list recovery algorithm;

the evaluation code is a folded Reed-Solomon code, a Reed-Muller code or an algebraic code;

the server computes the image of each encoding function corresponding to a data item by means of a public hash function, and adds said image to the protected set;

the data are biometric data;

the biometric data comprise information relating to the fingerprints of individuals, said data being in the form of lists of triplets (x, y, θ) of coordinates of minutiae of fingerprints of individuals;

each coordinate of a triplet (x, y, θ) is coded on one byte, and the alphabet contains all the possible configurations of triplets each coordinate of which is coded on one byte.

The invention further concerns a method for identifying an individual, in a system comprising a control server, suitable for acquiring a biometric data item of the individual to be identified, and a server managing a base containing individual biometric data of listed individuals, in which, in order to identify the individual, his data item is compared with the N data in the base in order to identify the data item or items in the base having a degree of similarity with the data item of the individual exceeding a predetermined threshold, the method being characterised in that, before the step of comparing the data item of the individual with the data in the base, these are encrypted by the management server using the method according to one of the preceding claims.

Advantageously, but optionally, the identification method may also comprise at least one of the following features:

the biometric data item of the individual to be identified is in the form of a list of elements, each element of which is a symbol of the alphabet, and in which the management server communicates the protected set to the control server and, from the biometric data item of the individual to be identified, the control server implements a step of decrypting the protected set, the decrypting step comprising the steps consisting of:

selecting a subset of the protected set comprising all the indexed sets corresponding to the symbols of the alphabet present in the list of elements that constitutes the data item of the individual, using a list recovery algorithm the argument of which is said selected subset and the result of which is a set of encoding functions such that, if the data item of the individual corresponds to a data item in the base, the set of encoding functions contains the encoding function corresponding to said data item, from the encoding function or functions obtained, the control server determines the data item or items in the base corresponding to the data item of the individual with a degree of similarity greater than a predetermined threshold, the control server determines the image of the encoding functions of the set resulting from the list recovery algorithm by means of the public hash function, and compares this image with the images of the encoding functions corresponding to the data in the base contained in the protected set.

PRESENTATION OF THE FIGURES

Other features, aims and advantages of the invention will emerge from the following description, which is purely illustrative and non-limitative, and which must be read with regard to the accompanying drawings, in which.

DETAILED DESCRIPTION OF AT LEAST ONE EXAMPLE EMBODIMENT

Figure 1A:
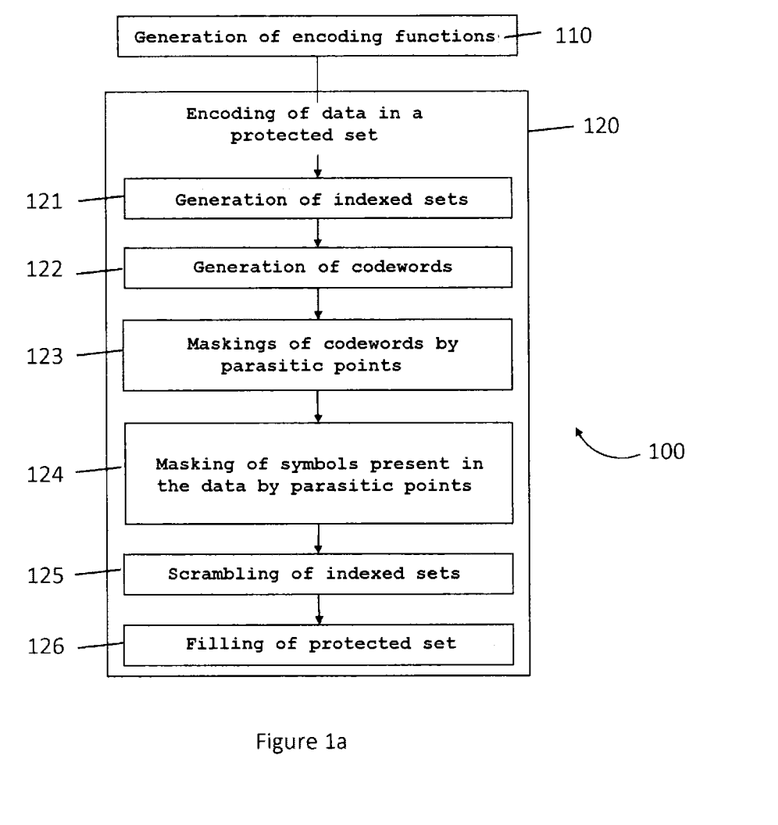
FIG. 1a shows the steps of the encrypting method proposed by the invention.

The main steps of a method for encrypting a plurality of data $A_j$ in a database DB are described with reference to FIG. 1.

Notations and Vocabulary

The database DB contains a number n of secret data $A^j$ (j=1 ... n), each data item $A^j$ being in the form of a list of elements, for example of t indexed elements $\alpha_i^j$, i=1 ... t, so that each $A^j$ is written $A^j = (\alpha_1^j, \ldots, \alpha_t^j)$. Alternatively, the data $A^j$ may be of different sizes from one another.

The elements $a_i^j$ of each $A^j$ are preferably binary elements or vectors, each coordinate of which is a binary element.

The present invention fits within code theory, which uses certain mathematical objects, the definitions of which are given again here.

$\mathcal{E}$ is an alphabet, that is to say a set containing N symbols $x_1 \ldots x_N$, such that each element of the data item $A^j$ is a symbol of the alphabet $\mathcal{E}$. This alphabet is defined according to the way in which the data $A^j$ are coded.

Thus for example, if the elements of the data $A^j$ are values coded on a certain number of bits, the alphabet $\mathcal{E}$ comprises all the binary codes coded on this number of bits. For data $A^j$ coded on one byte, the alphabet $\mathcal{E}$ comprises the two hundred and fifty six (256) possible bytes.

An evaluation function is also defined as follows:

let D be a finite set, let $P_1 \ldots P_N$ be N distinct points of coordinates taken in D, let P be a subset of the set of functions of the Cartesian product D* ... *D with values in a set Y, Y being able for example to be the set D, an evaluation function ev is defined by $$ev: P \to Y^N$$

$$f \mapsto (f(P_1), \ldots, f(P_N)).$$

Furthermore, if $L_k$ is a subset of P of dimension k, C=ev($L_k$) is an evaluation code defined by $L_k$. It is said that C is an evaluation code on Y of length N and dimension k.

Finally, codeword means an element of the code C, that is to say the evaluation of a function f by the evaluation function ev(f).

Encrypting of the Data in the Base

The encrypting 100 of the data $A^j$ in the base is done by the implementation, by a computer server, of the steps identified in FIG. 1.

Generation of the Encoding Functions

During step 110, a server randomly generates, for each data item A in the base, a corresponding encoding function $F_j$.

Encoding function means a function that associates a coordinate of a codeword with an element.

In the present case, encoding functions $F_j$ associated with an evaluation code for which there exists a list recovery algorithm are chosen.

For example, Reed-Muller codes are known, algebraic codes such as Goppa codes, or codes known by the term "folded Reed-Solomon codes".

In the context of the present invention, a folded Reed-Solomon code is advantageously used, which is defined as follows:
let F be a finite body of cardinal q (F=GF(q)), and γ a generator of F,
the version folded m-times of the Reed-Solomon code C[u, k], denoted $FRS_{\mathcal{F},\gamma,m,N,k}$, is a code of block size $$N = \frac{u}{m} \text{ on}$$

$F^m$ where u=q−1 is divisible by m,
the coding of a message p∈F[X] of degree to the maximum k−1 is given by the application of the evaluation function $ev(f)=f(P_1, \ldots, P_N)$ where $P_i = \gamma^{m(i-1)}$ and $$f(x) = \left( \begin{bmatrix} p(x) \\ \vdots \\ p(x \times \gamma^{m-1}) \end{bmatrix} \right).$$

In the case of an evaluation code of the folded Reed-Solomon code type, the encoding functions $F_j$ corresponding to the data $A^j$ are then defined as follows:
let $f_j$ be a function chosen randomly in F[X], for example it may be a polynomial of degree k−1,
$F_j(x_i)=f_j(P_i)$, where $P_i=\gamma m^{(i-1)}$. $F_j(x_i)$ is the $i^{th}$ coordinate of the codeword $ev(f_j)$.

Encoding of the Data in a Protected Set

Returning to FIG. 1, the server generates, during an encoding step 120, from the encoding functions, a protected set LOCK ($A^j$) in which the data in the base are encrypted.

To do this, the server generates, during a step 121, as many sets $S_i$ as there are symbols in the alphabet $\mathcal{E}$, each set $S_i$ corresponding to an element $x_i$ in the alphabet $\mathcal{E}$.

The server also defines two security parameters, l and r.

The first security parameter, l, is an integer associated with an indexed set $S_i$. This integer may vary from one set $S_i$ to another, or be the same for all the sets $S_i$.

The second security parameter, r, is also an integer. Its role is described in more detail hereinafter.

When the algorithm is initialised, the sets $S_i$ contain no element.

Then, for each symbol $x_i$ in the alphabet $\mathcal{E}$,
for each data item $A^j$ in the base,
if $x_i \in A^j$ then the server calculates the image of the symbol $x_i$ by the encoding function $F_j$ corresponding to the data item $A^j$, $F_j(x_i)$, during a step 122. As indicated previously, this image is a coordinate of a codeword, a function of the data item $A^j$ and of the symbol $x_i$ of the alphabet $\mathcal{E}$. The server adds this value to the set $S_i$ corresponding to the symbol $x_i$.

Then the server adds to the indexed set $S_i$ parasitic or error-inducing points, during a step 123, until the cardinal of the indexed set $S_i$ reaches the integer l determined previously.

The error-inducing points are chosen randomly in the set Y deprived of images of the symbols of the alphabet $\mathcal{E}$ by the encoding functions $F_j$ corresponding to the data $A^j$. Thus these error-inducing points are independent of the encoding functions.

These error-inducing points prevent identification of the authentic codewords. They therefore prevent the determination of the encoding functions $F_j$ of the data Aj from the symbols of the alphabet $\mathcal{E}$ and the codewords.

The integer l is a security parameter of the encrypting method. Its value depends on the decrypting algorithm that it is wished to use subsequently and the computing time that can be tolerated. Where it is chosen to use a folded Reed-Solomon code, the integer l is typically less than m, m being one of the parameters of the folded Reed-Solomon code, and also less than the number n of data $A^j$ in the base.

Moreover, the server holds a counter of the number of non-empty indexed sets $S_i$, this counter being incremented by 1 if a symbol $x_i$ of the alphabet $\mathcal{E}$ is present in at least one of the data $A^j$. The counter value is called cpt.

At the end of these first steps 122, 123, empty indexed sets $S_i$ may remain, if the symbol of the corresponding alphabet $x_i$ is not present in any data $A^j$ in the base.

The server then randomly chooses, during a step 124, indices $i_e$, $i_e=\{i_{cpt+1}, \ldots, i_r\}$, such that the indexed sets $S_{i_e}$ are empty, and adds parasitic or error-inducing points to these sets, until the cardinal of each indexed set $S_{i_e}$ reaches the value l.

Here again, the error-inducing points are chosen in Y deprived of images of the symbols of the alphabet by the encoding functions $F_j$ corresponding to the data $$A_j = \left(Y \setminus \{\mathcal{F}_d(x_{i_e})\}_{d=1, \ldots, n}\right).$$

At the end of step 123, N-r empty sets $S_i$ remain.

The security parameter r therefore represents the number of non-empty indexed sets $S_i$ at the end of the encrypting step 120.

r is a positive integer, less than N, the number of symbols in the alphabet $\mathcal{E}$, chosen according to the number of data $A^j$ in the base. Preferably, r has been chosen so that r has the same order of magnitude as N, the number of symbols in the alphabet. It is even possible to have r=N, so that no empty set remains during the encrypting step 120.

By way of non-limitative example, N may have an order of magnitude of $10^4$, and then r is preferably between a few thousands and the value of N, around a few tens of thousands.

This step 124 of adding error-inducing points in sets $S_{i_e}$ not comprising any codeword confers additional security on the encrypting algorithm since these sets $S_{i_e}$ prevent a determination of which symbols of the alphabet are present in the data $A^j$ in the base.

Figure 1B:
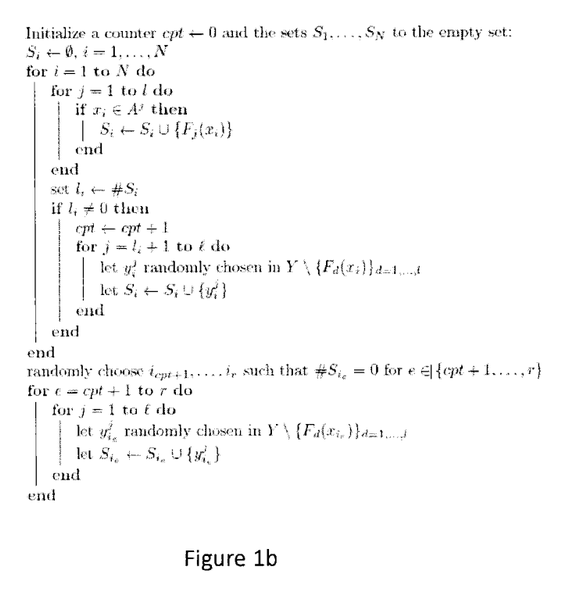
FIG. 1b is the algorithm implementing the first steps of the method.

The mathematical algorithm of steps 121 to 124 is appended in FIG. 1b.

Finally, during a step 125, the server scrambles the elements of each indexed set $S_i$. This scrambling is implemented by random re-indexing of the elements within each set $S_i$.

Indeed, the codewords having been added first to the sets $S_i$, their position in these sets would make it possible to identify them. The scrambling thus enables the codewords to have a random position in the sets $S_i$.

Finally, during a step 126, pairs consisting of a symbol of the alphabet and a corresponding indexed set are added to the protected set LOCK, for each symbol in the alphabet.

For probative purposes elaborated on below, the server may also, during a step 127, calculate the image by means of a public hash function Hash of each encoding function $F_j$ that was used to generate the codewords, and integrate these images Hash($F_j$) in the set LOCK, which is then written LOCK($A^j$, Hash($F_j$)).

Decrypting

Figure 2:
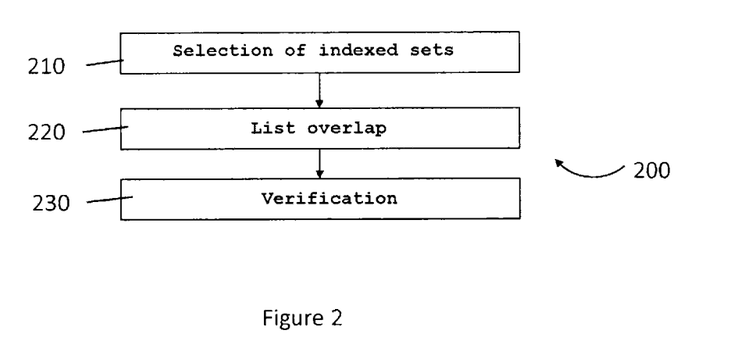
FIG. 2 shows the steps of the decrypting method.

Once the data $A^j$ have been encrypted in the set LOCK, this set is used to determine, from a data item B, the data item $A^j$ having the most similarities with the data item B, without providing any information on the data $A^j$. It is this step 200 that is called decrypting, and the steps of which are illustrated in FIG. 2.

The data item B is a list of t elements $\{b_1, \ldots, b_t\}$, each element $b_i$ of which is a symbol $x_i$ in the alphabet $\mathcal{E}$.

A server having to proceed with the decrypting selects, during a step 210, among the indexed sets $S_i$ stored in the set LOCK, those $S_{i_e}$ corresponding to elements $x_{i_e}$ included in B, that is to say the sets $S_{i_e}$ the indices $i_e$ of which are such that $x_{i_e} = b_e$, for $e=1, \ldots, t$.

The server next uses a list recovery algorithm having as its input all the pairs $\{(x_{i_1}, S_{i_1}), \ldots, (x_{i_t}, S_{i_t})\}$, during a step 220.

This list recovery algorithm depends on the code chosen to encrypt the data $A^j$. In the case where the code is a folded Reed-Solomon code, a suitable list recovery algorithm is the Guruswami list decrypting algorithm described in the publication by Venkatesan Guruswami, Linear-algebraic list decoding of folded Reed Solomon Codes, in *IEEE Conference on Computational Complexity*, pages 77-85. IEEE Computer Society, 2011.

The list recovery algorithm supplies as a result a list of codewords that have a degree of similarity with the indexed sets $S_i$ that exceeds a predetermined threshold. In these codewords, one or more encoding functions are deduced that correspond to the encoding function or functions $F_j$ of the data $A^j$ that have a degree of similarity with the data item B above a predetermined threshold.

In particular, if the data item B corresponds to one of the data $A^j$, the encoding function $F_j$ corresponding to this data item $A^j$ is obtained from the results of the list recovery algorithm.

The functions resulting from this algorithm are such that, for a proportion of the $x_{i_e}$ such that $x_{i_e} = b_e$, said proportion being determined from the similarity threshold between the data $A^j$ and the data item B, this gives $F_j(x_{i_e}) \in S_{i_e}$, which is the case only for $A^j$s similar to B.

If it is wished to obtain the proof that a function that is the result of this algorithm is indeed an evaluation function of a corresponding data item $A^j$, the server can calculate, during a verification step 230, the image of this result function by the public hash function Hash mentioned above, and compare this result with the hashings of each of the data $A^j$ that are stored in the protected assembly LOCK.

Finally, from the encoding function $F_j$, the server can find the data item $A^j$. To do this, the image of all the symbols $x_i$ are computed by means of the encoding function $F_j$, and it is determined whether $F_j(x_i)$ belongs to the indexed set $S_i$. If such is the case, then $x_i$ belongs to the data item $A_j$. It is then possible to reconstruct the data item $A_j$.

Application to Biometric Identification

A preferential application of this encrypting algorithm and the corresponding decrypting algorithm is that of biometric identification.

Biometric identification is illustrated schematically in FIG. 1b.

The identification of an individual consists of comparing a data item particular to this individual with similar data of referenced individuals in order to determine whether the individual to be identified corresponds to one of the referenced individuals with a degree of similarity exceeding a predetermined threshold.

The referenced individuals may for example be individuals whose access to a place is authorised, or alternatively individuals sought by the police.

Figure 3:
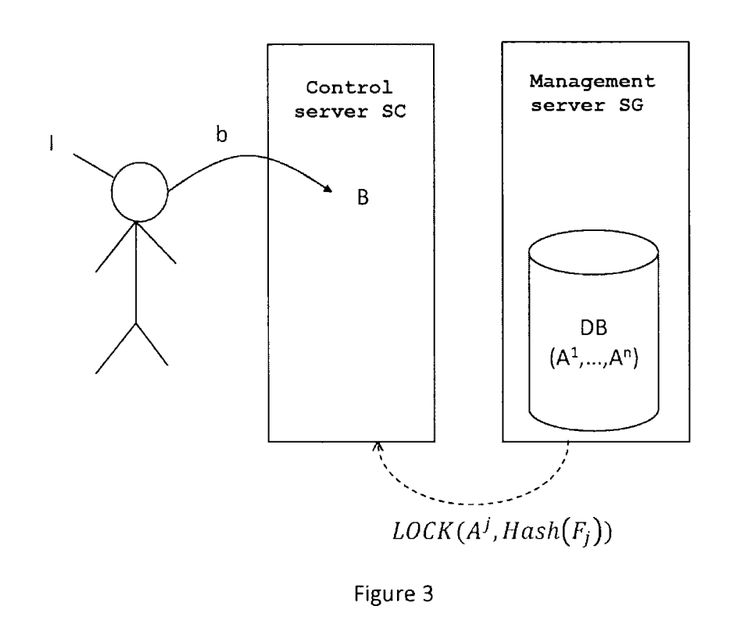
FIG. 3 shows schematically the implementation of the identification method according to the invention.

For example, in FIG. 3, the data item B is an acquisition coded in binary, by a control server SC, of a biometric character b of the individual I whom it is wished to identify.

This biometric character may for example be an iris or a fingerprint.

Figure 4A:
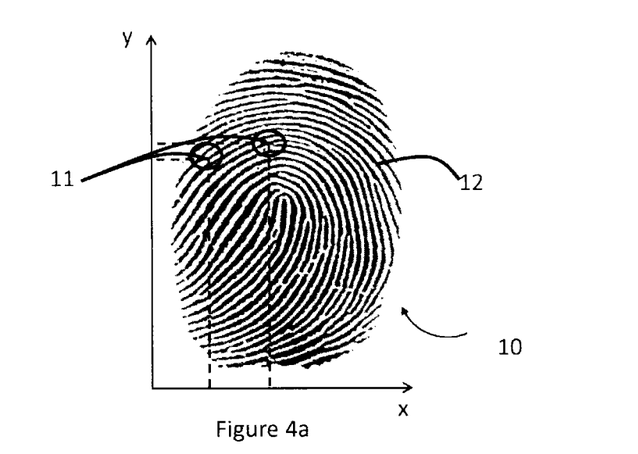
FIGS. 4a, 4b and 4c show the conventions used for coding a fingerprint of an individual.

With reference to FIG. 4, the way in which the fingerprints are coded has been illustrated. A fingerprint 10 illustrated in FIG. 4a is characterised by irregularities referred to as minutiae 11 on the lines 12 that make them up. The minutiae 11 may for example be ends of lines or bifurcations.

The number, form and position of the minutiae on a fingerprint 10 make this fingerprint unique and specific to the individual carrying it. Consequently it is the minutiae that are used to code a fingerprint.

Figure 4B:
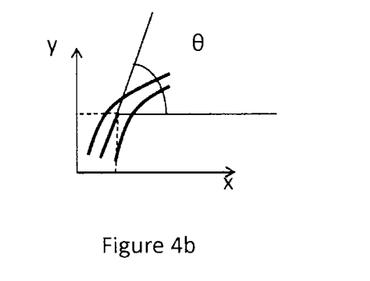
Figure 4C:
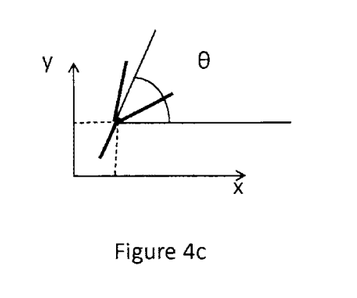

The coding of a fingerprint 10 is a set of triplets $(x, y, \theta)$ in which X and y indicate the abscissa and the ordinate of a minutia on a normalised reference frame identified in FIGS. 4a, 4b and 4c, and $\theta$ is the angle formed by the direction of the line 12 with respect to the X-axis. More precisely, in FIG. 4b, the minutia depicted is a line end, and $\theta$ is the angle between the direction of the line before being interrupted and the X-axis. In FIG. 4c, the minutia represents a bifurcation, and $\theta$ is the angle between the direction of the line before bifurcation and the X-axis.

x, y, and $\theta$ are each coded on one byte. The corresponding alphabet $\mathcal{E}$ for the encrypting method consists of all the possible triplets each coordinate of which is coordinated on one byte. There exist 256 ($2^8$) possible bytes and therefore the alphabet $\mathcal{E}$ contains $N=256^3$ elements.

Returning to FIG. 3, biometric data $A^j$ of referenced individuals are stored in a database DB managed by a management server SG.

The management server SG uses the encrypting method described above on the data $A^j$ in order to create a protected set LOCK $(A^1, \ldots, A^N)$.

When an individual presents himself in order to be identified, the control server SC acquires a biometric data item B, either by means of a fingerprint sensor or by reading a chip stored in an identity document.

The control server SC then uses the decrypting algorithm described above in order to determine which data item $A^j$, if such exists, corresponds to the data item B of the individual with a degree of similarity above a predetermined threshold.

An encrypting algorithm has therefore been developed enabling a plurality of data $A^j$ to be encoded in a protected set. This algorithm constitutes an extension of the fuzzy vault scheme, the latter not making provision for coding several data, even more so when these data have elements in common.

This algorithm also makes it possible to minimise the storage space for the encoding of the data since the error-inducing points are added for all the data.

Furthermore, it makes it possible to effect only one decoding for all the data, which may represent a saving in computing time, depending on the list recovery algorithm to be used.

The invention claimed is:

1. A method for encrypting a set of at least two indexed data items, implemented by a management computer server, the data items being in the form of lists of elements, each element of which belongs to a finite set of indexed symbols called an alphabet, the method comprising:

randomly generating for each data item in a base, using the management computer server, a corresponding encoding function, and for each symbol of the alphabet,
   for each data item,
      if at least one element of the list that constitutes the data item is the symbol of the alphabet, the management computer server determines an image of said symbol of the alphabet via the encoding function corresponding to the data item to obtain a codeword coordinate that is a function of the data item and the symbol of the alphabet,
      the management computer server adds the codeword coordinate thereby obtained to an indexed set corresponding to the element of the alphabet, the indexed set having a predetermined cardinal,
   then the management computer server randomly re-indexes the elements of the indexed set corresponding to the symbol of the alphabet, and
   the management computer server adds the indexed set corresponding to the symbol of the alphabet to a protected set, and in that, for each symbol in the alphabet, prior to the re-indexing by the management computer server, the management computer server completes the indexed set corresponding to the alphabet element with error-inducing points, wherein the data items are biometric data items, and wherein the biometric data items include information relating to fingerprints of individuals, said biometric data items being in the form of lists of triplets of coordinates of minutiae of fingerprints of the individuals.

2. The method according to claim 1, wherein, for the symbols of the alphabet that do not correspond to any element of the data items in the base,
   the management computer server randomly selects some of said elements, and
   for each element selected, the management computer server creates a predetermined cardinal set with an index corresponding to that of the element, and adds to this element as many error-inducing points as the cardinal of the element.

3. The method according to claim 2, wherein non-selected symbols of the alphabet are associated with an empty set.

4. The method according to claim 2, wherein the error-inducing points are points generated randomly among a destination set of the encoding functions, deprived of the images of the symbols of the alphabet by the encoding functions corresponding to the data items.

5. The method according to claim 1, wherein the encoding functions corresponding to the data items are associated with an evaluation code for which there exists at least one list recovery algorithm.

6. The method according to claim 5, wherein the evaluation code is a folded Reed-Solomon code, a Reed-Muller code or an algebraic code.

7. The method according to claim 1, wherein the computer management server computes an image of each encoding function corresponding to one of the data items using a public hash function, and adds said image to the protected set.

8. The method according to claim 1, wherein each said respective coordinate of the triplets is coded on one byte, and the alphabet contains all possible configurations of triplets.

9. The method according to claim 1, further comprising:
electronically capturing a physical biometric characteristic; and converting the captured physical biometric characteristic into the biometric data items.

10. A method for identifying an individual, in a system comprising a control computer server configured to acquire a biometric data item of the individual to be identified, and a management computer server configured to manage a base containing encrypted individual biometric data items of listed individuals, the method comprising:

providing the encrypted individual biometric data items of listed individuals, the individual biometric data items having been encrypted using an encryption method for encrypting a set of at least two indexed biometric data items, implemented by the management computer server, the biometric data items being in the form of lists of elements, each element of which belongs to a finite set of indexed symbols called an alphabet, where the encryption method includes:

randomly generating for each biometric data item in a base, using the management computer server, a corresponding encoding function, and for each symbol of the alphabet,
   for each biometric data item,
      if at least one element of the list that constitutes the biometric data item is the symbol of the alphabet, the management computer server determines an image of said symbol of the alphabet via the encoding function corresponding to the biometric data item to obtain a codeword coordinate that is a function of the biometric data item and the symbol of the alphabet,
      the management computer server adds the codeword coordinate thereby obtained to an indexed set corresponding to the element of the alphabet, the indexed set having a predetermined cardinal,
   then the management computer server randomly re-indexes the elements of the indexed set corresponding to the symbol of the alphabet, and
   the management computer server adds the indexed set corresponding to the symbol of the alphabet to a protected set, and in that, for each symbol in the alphabet, prior to the re-indexing by the management computer server, the management computer server completes the indexed set corresponding to the alphabet element with error-inducing points; and identifying the individual to be identified by comparing the biometric data item of the individual with N biometric data items in the base to identify the biometric data item or items in the base having a degree of similarity with the biometric data item of the individual exceeding a predetermined threshold.

11. The method according to claim 10, wherein the management computer server communicates the protected set to the control computer server, and, from the biometric data item of the individual to be identified, the control computer server decrypts the protected set, the decrypting including:

selecting a subset of the protected set comprising all the indexed sets corresponding to the symbols of the alphabet present in the list of elements that constitutes the biometric data item of the individual, and using a list recovery algorithm, an argument of which is said selected subset, and the result of which is a set of encoding functions such that, when the biometric data item of the individual corresponds to a biometric data item in the base, the set of encoding functions contains the encoding function corresponding to said biometric data item.

12. The method according to claim 11, wherein, from the encoding function or functions obtained, the control computer server determines the biometric data item or items in the base corresponding to the biometric data item of the individual with the degree of similarity greater than the predetermined threshold.

13. The method according to claim 11, wherein the control computer server determines an image of encoding functions of the protected set resulting from the list recovery algorithm using a public hash function, and compares the image with the images of the encoding functions corresponding to the biometric data items in the base contained in the protected set.

14. The method according to claim 10, further comprising:
   electronically capturing a physical biometric characteristic of the individual; and
   converting the captured physical biometric characteristic into the biometric data item of the individual.

* * * * *